United States Patent

Pfeifer

[11] Patent Number: 5,950,518
[45] Date of Patent: Sep. 14, 1999

[54] ROTARY DISK STEERING VALVE

[75] Inventor: Arnd Pfeifer, Willich, Germany

[73] Assignee: TRW Fahrwerksysteme GmbH & Co. KG, Dusseldorf, Germany

[21] Appl. No.: 09/073,677

[22] Filed: May 6, 1998

Related U.S. Application Data

[63] Continuation-in-part of application No. 08/650,339, May 20, 1996, abandoned.

[30] Foreign Application Priority Data

May 20, 1995 [DE] Germany ............................ 195 18 637

[51] Int. Cl.⁶ ...................................................... F15B 9/10
[52] U.S. Cl. .................................. 91/375 A; 137/625.21; 180/417; 180/426
[58] Field of Search ..................... 180/417, 421, 180/422, 426; 137/625.21, 625.23; 91/375 R, 375 A

[56] References Cited

U.S. PATENT DOCUMENTS

| | | |
|---|---|---|
| 2,988,059 | 6/1961 | Wysong, Jr. ............................ 91/375 A |
| 3,391,608 | 7/1968 | Huber . |
| 3,408,900 | 11/1968 | Tomita ................................ 91/375 A X |
| 3,735,832 | 5/1973 | Akima . |
| 3,998,131 | 12/1976 | Adams ................................. 91/375 A X |
| 4,281,684 | 8/1981 | Broeg . |
| 4,298,318 | 11/1981 | Tsuchiya et al. . |
| 4,300,594 | 11/1981 | Bacardit . |
| 4,436,171 | 3/1984 | Bertin . |
| 4,459,897 | 7/1984 | Bacardit . |
| 4,492,283 | 1/1985 | Bertin . |
| 4,535,798 | 8/1985 | Sano . |
| 4,594,936 | 6/1986 | Barcardit . |
| 4,672,884 | 6/1987 | Rosell et al. . |
| 4,818,200 | 4/1989 | White, Jr. . |
| 5,396,969 | 3/1995 | Joerg et al. . |

FOREIGN PATENT DOCUMENTS

| | | |
|---|---|---|
| 0021970 | 1/1981 | European Pat. Off. . |
| 0145546 | 6/1985 | European Pat. Off. . |
| 0181797 | 5/1986 | European Pat. Off. . |
| 2084141 | 12/1971 | France . |
| 2426818 | 12/1979 | France . |
| 2500397 | 8/1982 | France . |
| 1101187 | 3/1961 | Germany . |
| 2833009 | 2/1979 | Germany . |
| 4209647 | 9/1993 | Germany . |
| 4232570 | 3/1994 | Germany . |
| 4330338 | 9/1994 | Germany . |
| 52-020530 | 2/1977 | Japan . |
| 9400329 | 1/1994 | WIPO . |

OTHER PUBLICATIONS

Copy of European Search Report dated Jul. 11, 1996.

Primary Examiner—Hoang Nguyen
Attorney, Agent, or Firm—Tarolli, Sundheim, Covell, Tummino & Szabo

[57] ABSTRACT

A steering valve (30) directs hydraulic fluid from a hydraulic fluid source to a hydraulic cylinder of a steering system in a vehicle. The steering valve includes a rotatable first shaft (32) having a first face valve member (36) on an end portion of the first shaft and a rotatable second shaft (34) having a second face valve member (50) on an end portion of the second shaft. The first face valve member (36) includes a plurality of channels (40, 42) fluidly connected with the hydraulic cylinder and the second face valve member (50) includes a plurality of passages (54, 56) fluidly connected with the hydraulic fluid source. A rotatable intermediate disk (70) is located between the first and second face valve members (36, 50). The intermediate disk (70) includes a plurality of axially extending bores (80a–80d) for fluidly connecting the plurality of channels (40, 42) with the plurality of passages (54, 56). The intermediate disk (70) is controllably connectable with each of the first and second face valve members (36, 50) for rotation relative to the other of the first and second face valve members to provide different levels of steering assistance.

25 Claims, 5 Drawing Sheets

ROTARY DISK STEERING VALVE

This application is a continuation-in-part of application application Ser. No. 08/650,339 filed on May 20, 1996, abandoned.

FIELD OF THE INVENTION

The invention pertains to a rotary disk steering valve for supplying hydraulic fluid to a hydraulic cylinder. The valve is formed by an end region of an input shaft, an end region of an output shaft, and an intermediate member disposed between the two end regions. The end regions of the shafts and the intermediate member are provided with control channels for directing hydraulic fluid and are rotatable relative to each other.

BACKGROUND OF THE INVENTION

Steering valves of this generic class are commonly used in vehicle power steering systems. The construction of such steering valves is known. A steering input shaft is connected by a centering spring, such as a torsion bar, to an output shaft connected with a pinion which meshes with a rack. Movement of the rack effects steering of the vehicle. It is known to use a rotary valve which, as a result of rotation of the input shaft relative to the output shaft, either connects or disconnects hydraulic fluid channels which terminate in bores leading to either a hydraulic fluid pump or a hydraulic cylinder. When the input shaft is rotated relative to the output shaft, hydraulic fluid under pressure is supplied to the hydraulic cylinder which assists movement of the rack in one of two possible directions. Activation of such a steering valve occurs by rotation of the input shaft relative to the output shaft wherein a torsional moment resulting from the torsion bar must be overcome.

In one known steering valve, a valve bushing rotates with the output shaft and surrounds the input shaft. The valve bushing has control channels which, as a control means, can be made to coincide with bores which pass through a housing in order to direct hydraulic fluid.

Another known steering valve is a rotary disk steering valve which has channels which lie essentially axially and which are made to coincide with each other. Such a rotary disk steering valve is known from DE 42 09 647 A1, wherein a valve bushing connected to the input shaft is surrounded by a valve bushing connected to the output shaft. The valve bushings overlap in a region where annular surfaces on each valve bushing lie next to each other. Each valve bushing has bores located in the region of their respective annular surfaces. The bores are connected to hydraulic fluid lines. By rotating one of the valve bushings relative to the other valve bushing, the bores are caused to either coincide or separate, which leads to a connection or separation of the corresponding fluid lines. Similar rotary disk steering valves are known from DE 28 33 009 A1 and DE 42 32 570 C1.

The known rotary disk steering valves require a multitude of additional components in order to form the rotary valve. This causes the size of these steering valves to be undesirably large and their manufacture to be very costly. Due to the use of valve bushings, guiding the hydraulic fluid to the annular surfaces is problematic. It is frequently necessary to form bores which intersect multiple times with each other. Such bores can also be connected to each other by diagonal channels. Since it is necessary to provide a minimum tolerance for a valve having a control bushing, and since the bushing is deformed during operation under the pressure of the hydraulic fluid which can lead to an increase in friction, the known rotary valves are expensive to manufacture. During assembly, the adjustment of elements, such as valve bushings, which move relative to each other is also very costly because a corresponding hydraulic seal must be established with each valve bushing.

Finally, it is known to construct rotary valves with annular disks on the annular surfaces. Control edges on the annular disks are formed by bores or elliptical formations which lie on arcs of a circle. A relative rotation of the annular surfaces results in a variable overlapping of opposing circular bores, which is minimal at first but which increases with the amount of rotation. The initially limited overlapping of the control edges is known to lead to noise due to hydraulic fluid flow, which is frequently found to be a disadvantage.

In order to improve this type of rotary disk steering valve such that the same can be manufactured with few components and limited expense in a compact design, it is known from DE 195 05 384 A1 to form a valve in the region of the opposing end surfaces of the input shaft and output shaft. In this configuration, it is necessary to form opposing end surfaces on the input and output shafts in order to form the rotary valve. Axially extending control channels are formed in the opposing end surfaces of the shafts. Additional components are omitted and the size of the valve is reduced.

Regardless of whether the valve is formed by a valve bushing or by control channels provided in the region of opposing end surfaces of the input and output shafts, the known valves are subject to the disadvantage that the characteristic control features are not variable. Once a valve has been manufactured, its control characteristics cannot be varied, particularly in response to functional vehicle parameters, such as vehicle speed. As disclosed in DE 4,330,338 C1, an additional problem of the known rotary disk steering valves is that automatic control of a steering valve can be realized only at great expense for components and for a control means for controlling the steering valve.

SUMMARY OF THE INVENTION

Starting with this state of the art, the underlying purpose of the present invention is to improve a rotary disk steering valve of this generic class to the extent that it enables a variation of the characteristic control features and facilitates an automatic control of the vehicle steering valve.

In order to find a technical solution to this problem, a steering valve of this generic class is improved by including at least one intermediate link having control openings and arranged between the two end regions of the shafts which form the valve. The configuration according to the invention provides a rotary disk steering valve which, by virtue of the intermediate link, can be varied in the adjoining regions of the shafts.

In a construction where the valve is formed by a valve bushing which cooperates with a spool valve formed on the input shaft in a conventional manner, or in a construction where the valve is formed by channels arranged in axially opposing regions of the shafts which can rotate relative to each other, an intermediate link is interposed, either in the form of a bushing or, according to a preferred embodiment of the invention, in the form of a disk.

According to the preferred embodiment of the invention, the intermediate link is connected to at least one region forming the valve. In the case of an intermediate disk, this is either the input shaft or the output shaft. It is advantageous for the connection of the intermediate disk to either the input shaft or the output shaft to be dependent on functional vehicle parameters. A connecting pin actuated by a mechanical actuator or other equivalent means can be used to make this connection. Alternatively, an electrorheological element or an element employing friction forces or magnetism forces could also be used to make this connection. It is essential for the intermediate disk to be connected to one or the other of the regions of the shafts forming the valve depending on one or more functional vehicle parameters such as vehicle speed or hydraulic fluid pressure. Consequently, the respective control channel on the surface of the end region of one of the shafts can be activated in order to adjust for the desired response characteristic. Hence, for example, an intermediate disk or an intermediate bushing can be rigidly connected to the input shaft for parking of the vehicle, and rigidly connected to the output shaft under driving conditions. For fine-tuning of the rotary disk valve of the present invention, it is advantageous to provide the intermediate link with an adjusting element, preferably an annular setting ring gauge.

According to an additional embodiment of the invention, the intermediate link can be driven by a servomotor and associated actuator. This embodiment provides for automatic control of the steering valve to be realized easily. The actuator moves the intermediate link relative to the opposing end regions of the shafts which have control channels to achieve the desired automatic control of the steering valve.

According to another embodiment of the invention, multiple intermediate links can be used instead of a single intermediate link. This embodiment enables a particularly fine modulation and variation of the characteristics of the steering valve.

The present invention provides a rotary disk steering valve which can be adapted in the utmost degree to the demands of a control means and, in addition, ensures the simplest realization of an automatic control means. Through the use of an intermediate link with different control openings and/or different control edges on the respective surfaces, a different response characteristic of the rotary disk steering valve can be achieved according to which one of the end regions of the shafts is rotated relative to the other respective end region.

Basic adjustment of the valve according to the present invention is greatly simplified and tolerances can be decreased in comparison to conventional rotary valves. Finally, the valve according to the present invention is effective in limiting noise.

BRIEF DESCRIPTION OF THE DRAWINGS

The foregoing and other features of the present invention will becomes apparent to one skilled in the art to which the present invention relates upon consideration of the following description of the invention with reference to the accompanying drawings, wherein.

DESCRIPTION OF PREFERRED EMBODIMENT

Figure 1:
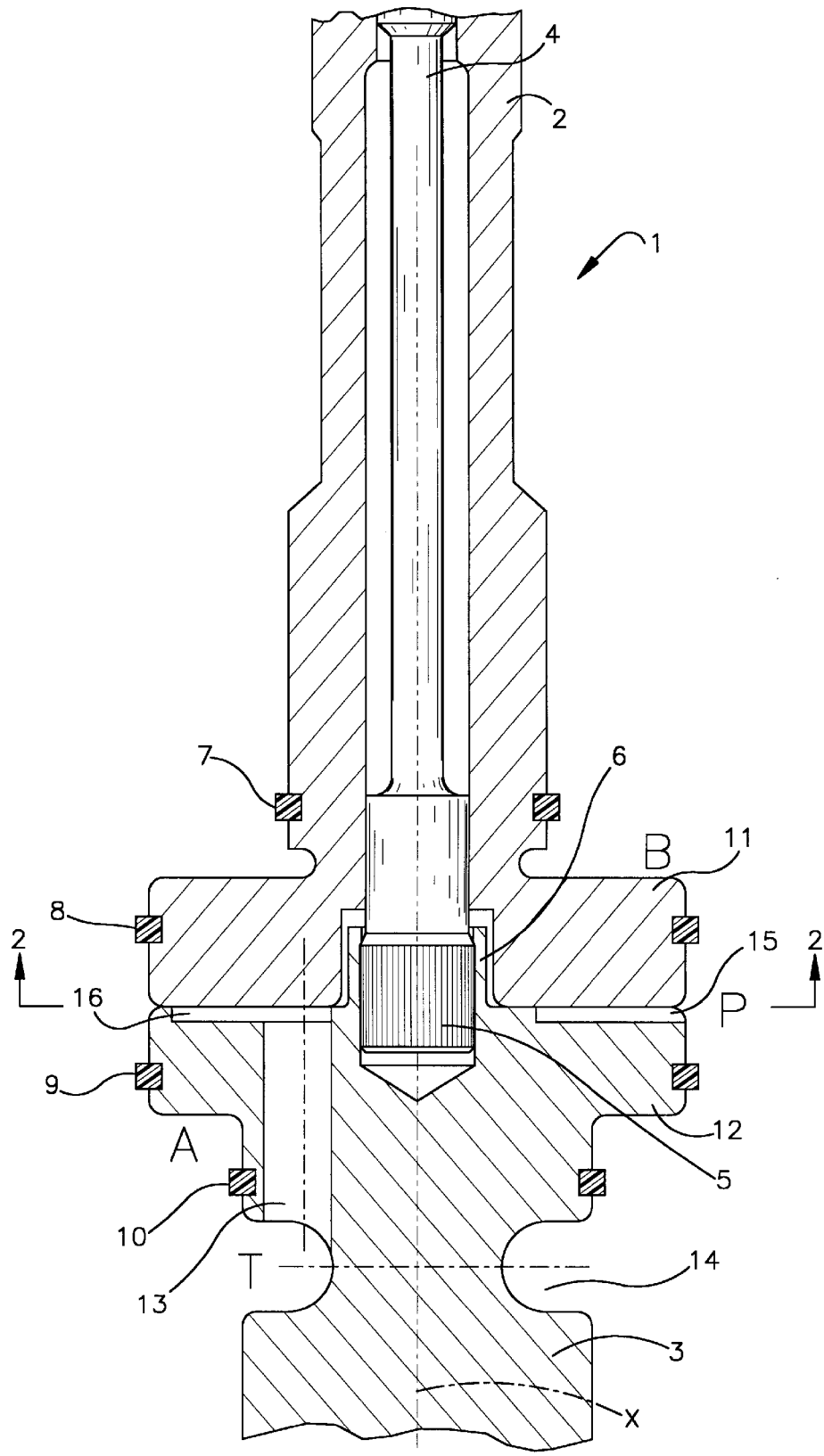
FIG. 1 is a schematic view, taken partly in section, of a steering valve according to the prior art.
Figure 2:
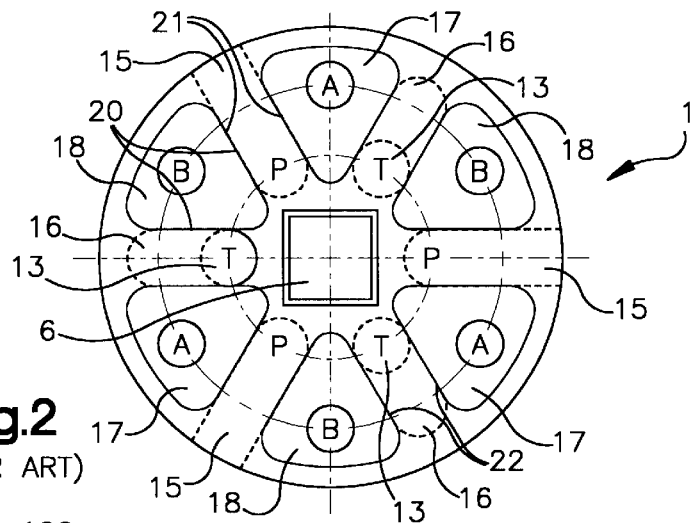
FIG. 2 is a schematic view taken along line 2—2 of FIG. 1 illustrating the various channels and bores formed in the end regions of the steering valve of FIG. 1, the steering valve being shown in the neutral position.

FIGS. 1 and 2 illustrate a steering valve 1 known from DE 195 05 384 A1. The steering valve 1 comprises an input shaft 2 connected to a steering shaft (not shown), an output shaft 3 having a pinion (not shown) for engaging a rack (not shown), and a centering spring in the form of a torsion bar 4. The input shaft 2, the output shaft 3, and the torsion bar 4 are centered on an axis X. One end of the torsion bar 4 is connected to the input shaft 2 and the other end of the torsion bar is connected to the output shaft 3. The torsion bar 4 is connected for rotation with the output shaft 3 by splines 5. A centrally located, square-shaped tab 6 extends from the output shaft 3 and is received in a square-shaped recess in the input shaft 2. The recess in the input shaft 2 is slightly larger than the tab 6 on the output shaft 3 to permit a slight amount of relative rotation between the shafts. The valve 1 includes a plurality of annular seals 7, 8, 9, and 10 which separate the valve into a number of axial regions.

The input shaft 2 has a disk-shaped enlargement at one end forming a first valve member 11 adjacent the output shaft 3. The first valve member 11 includes a radially extending first surface and a plurality of pie-shaped channels 17, 18 (FIG. 2) formed in the first surface. The channels 17, 18 are fluidly connected to a hydraulic cylinder (not shown) by a plurality of axial bores A and B, respectively. The bores A fluidly connect to one side (referred to as the A-side) of the hydraulic cylinder, while the bores B fluidly connect to the other side (referred to as the B-side) of the hydraulic cylinder.

The output shaft 3 has a disk-shaped enlargement at one end forming a second valve member 12 adjacent the first valve member 11. The second valve member 12 has a radially extending second surface and a plurality of radially and axially extending passages 15, 16 formed in the second surface. The passages 15 are fluidly connected to a source for pressurized hydraulic fluid P (not shown). The passages 16 are fluidly connected to a hydraulic fluid tank return line T (not shown) by axial bores 13.

FIG. 2 illustrates the angular position of the channels 17, 18 and the passages 15, 16 in the neutral steering position. In the neutral position, radially extending control edges 19 and 20 of each of the channels 17 and 18, respectively, lie adjacent respective radially extending control edges 21 and 22 of each of the passages 15 and 16, respectively. When the steering shaft is rotated by the driver of the vehicle, the input shaft 2 is caused to rotate a limited amount relative to the output shaft 3. Such rotation (not shown) of the input shaft 2 causes one of the control edges 19, 20 of each channel 17, 18 to overlap a portion of a respective passage 15, 16 to provide fluid communication between each channel and the respective passage. The overlap occurs along the entire radially extending control edge 19–22 of each channel 17, 18 and associated passage 15, 16 which helps to reduce the generation of noise as a result of hydraulic fluid flow through the channels and passages.

During assembly of the known steering valve 1, after a hydraulic centering process is completed, the position of the input shaft 2, the output shaft 3, and the torsion bar 4 are fixed relative to one another by a centering pin (not shown).

Figure 3:
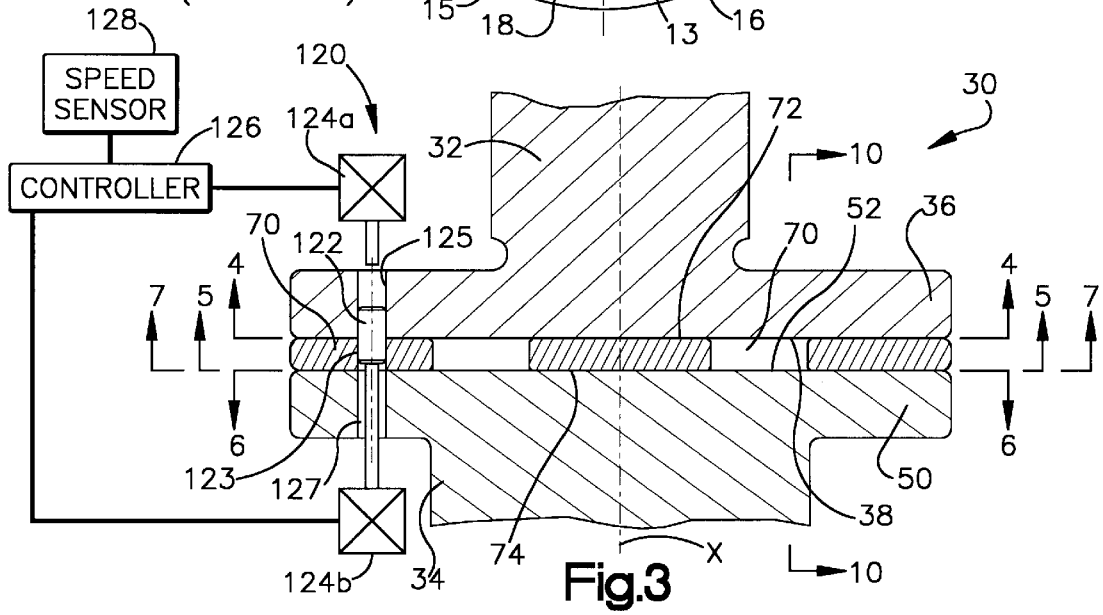
FIG. 3 is a schematic sectional view of a portion of a steering valve constructed in accordance with the present invention, with certain features of the steering valve being omitted for clarity.

A portion of a steering valve 30 constructed in accordance with the present invention is illustrated in FIG. 3. The steering valve 30 is centered on an axis X and includes an input shaft 32 similar to the input shaft 2 in FIG. 1, an output shaft 34 similar to the output shaft 3 in FIG. 1, and a torsion bar (not shown) similar to the torsion bar 4 in FIG. 1.

Figure 4:
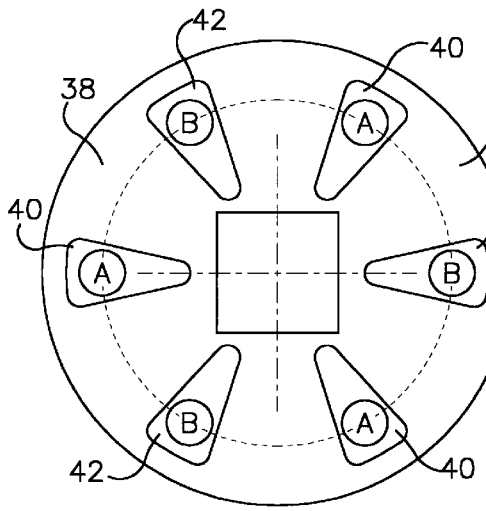
FIG. 4 is a schematic view taken along line 4—4 in FIG. 3 showing the end region of one component of the steering valve.

The input shaft 30 has a disk-shaped first face valve member 36 formed at one end thereof. The first face valve member 36 includes a radially extending first surface 38 and a plurality of pie-shaped channels 40 and 42 (FIG. 4) formed in the first surface. The channels 40 and 42 are fluidly connected to a hydraulic cylinder (not shown) by a plurality of axial bores A and B, respectively. The bores A fluidly connect to one side (commonly referred to as the A-side) of the hydraulic cylinder, while the bores B fluidly connect to the other side (commonly referred to as the B-side) of the hydraulic cylinder.

Figure 6:
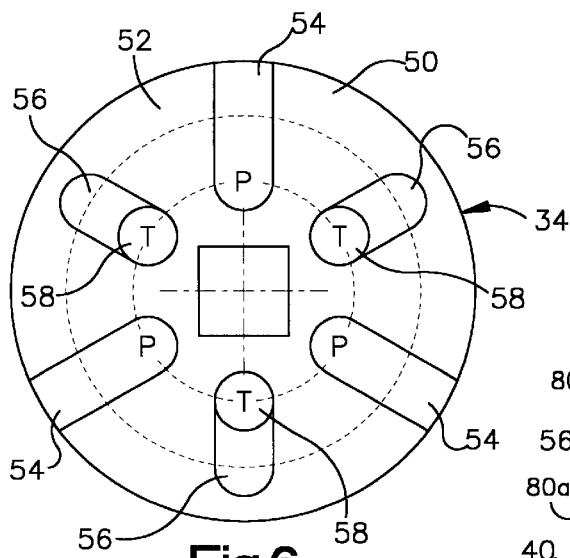
FIG. 6 is a schematic view taken along line 6—6 in FIG. 3 showing the end region of yet another component of the steering valve.

The output shaft 34 (FIG. 3) has a disk-shaped second face valve member 50 formed at an end thereof facing toward the first face valve member 32. The second face valve member 50 has a radially extending second surface 52 and a plurality of radially and axially extending passages 54 and 56 (FIG. 6) formed in the second surface. The passages are fluidly connected to a source for pressurized hydraulic fluid P (not shown). The passages 56 are fluidly connected to a hydraulic fluid tank return line T (not shown) by axial bores 58.

The steering valve 30 further includes an intermediate valve member comprising an intermediate disk 70. The intermediate disk 70 is located axially between the first and second face valve members 36 and 50 and has parallel, radially extending first and second side surfaces 72 and 74, respectively. The first side surface 72 of the intermediate disk 70 abuts the first surface 38 of the first face valve member 36 and the second side surface 52 abuts the second face valve member 50.

Figure 5:
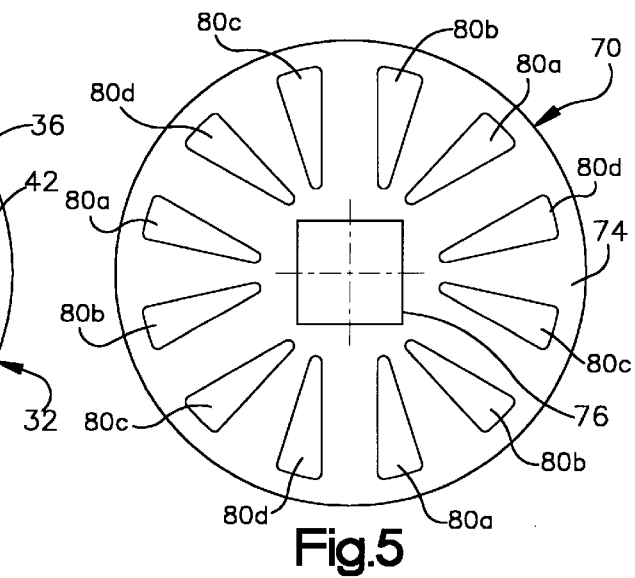
FIG. 5 is a schematic view taken along line 5—5 in FIG. 3 showing another component of the steering valve.
Figure 10:
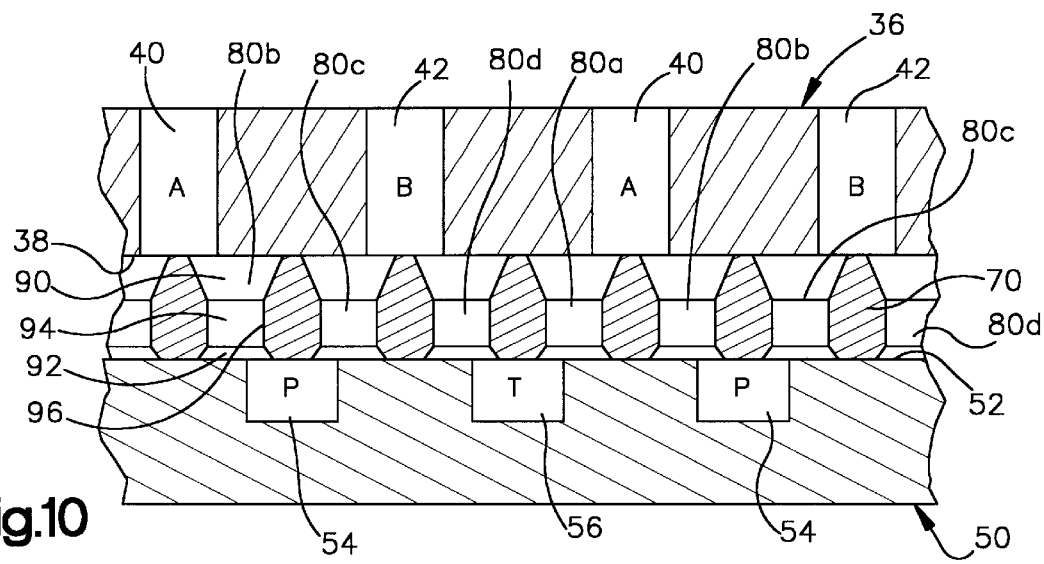
FIG. 10 is a schematic view taken approximately along line 10—10 in FIG. 3 illustrating the components of the valve in the neutral position.

The intermediate disk 70 includes a centrally located square aperture 76 (FIG. 5) for receiving a square tab (not shown) extending from the output shaft 34. The intermediate disk 70 further includes a circumferentially spaced plurality of axially extending openings 80a–80d. Each of the plurality of openings 80a–80d has a pie shape as shown in FIG. 5. Each opening 80a–80d has a flared first end portion 90 (FIG. 10) and a flared second end portion 92. The first and second end portions 90 and 92 are connected by a middle portion 94 comprising a cylindrical surface 96.

Figure 13:
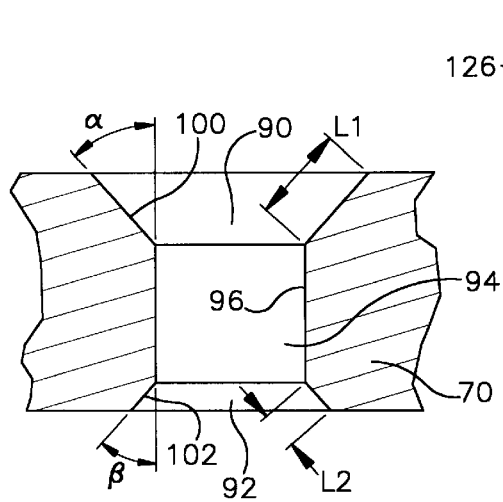
FIG. 13 is an enlarged view of a portion of one component of FIG. 10.

The flared first end portion 90 of each opening 80a–80d adjoins the first surface 38 of the first face valve member 36 and is defined by a first chamfer 100 (FIG. 13). The first chamfer 100 extends at a first angle α from the cylindrical surface 96 and has a first length L1. The flared second end portion 92 of each opening 80a–80d adjoins the second surface 52 of the second face valve member 50 and is defined by a second chamfer 102. The second chamfer 102 extends at a second angle β from the cylindrical surface 96 and has a second length L2. Preferably, the first angle α is smaller than the second angle β and the first length L1 is larger than the second length L2.

Figure 7:
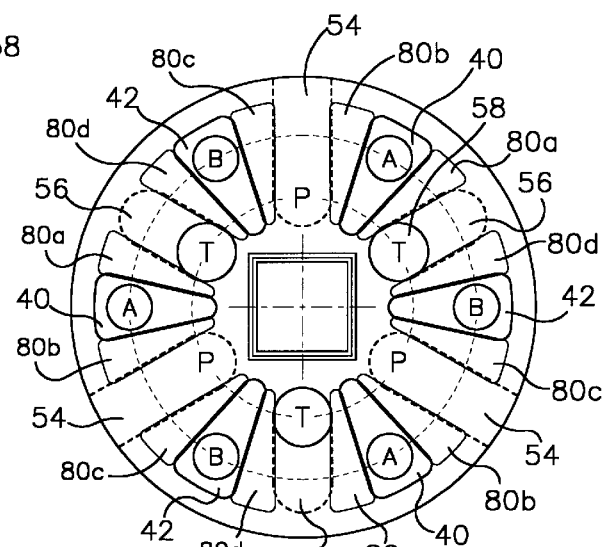
FIG. 7 is a schematic view taken along line 7—7 in FIG. 3 showing the components of FIGS. 4–6 together in a single view, the steering valve being shown in a neutral position.

The plurality of openings 80a–80d in the intermediate disk 70 provide fluid communication between the plurality of channels 40, 42 in the first face valve member 36 and the plurality of passages 54, 56 in the second face valve member 50. In a neutral steering position (shown in FIGS. 7 and 10), the middle portion 94 of each opening 80a–80d in the intermediate disk 70 axially overlaps an adjacent channel 40, 42 in the first face valve member 36 and an adjacent passage 54, 56 in the second face valve member 50. As may be seen in FIG. 10, the flared first end portion 90 of each of the openings 80a–80d provides additional flow area into the channels 40 and 42, and the flared second end portion 92 of each of the openings 80a–80d provides additional flow area into the passages 54 and 56.

The steering valve 30 further includes a device 120 (FIG. 3) which controllably connects the intermediate disk 70 for rotation with either the first face valve member 36 or the second face valve member 50. In accordance with the one embodiment of the present invention, the device 120 comprises an actuatable connecting pin 122 movable by a mechanical actuator 124a, 124b. The connecting pin 162 fits into an axially extending bore 123 which aligns with an axially extending bore 125 through the first face valve member 36 and with an axially extending bore 127 through the second face valve member 50. The actuator 124a, 124b is controlled by a controller 126 as a function of vehicle speed sensed by a speed sensor 128.

Figure 8:
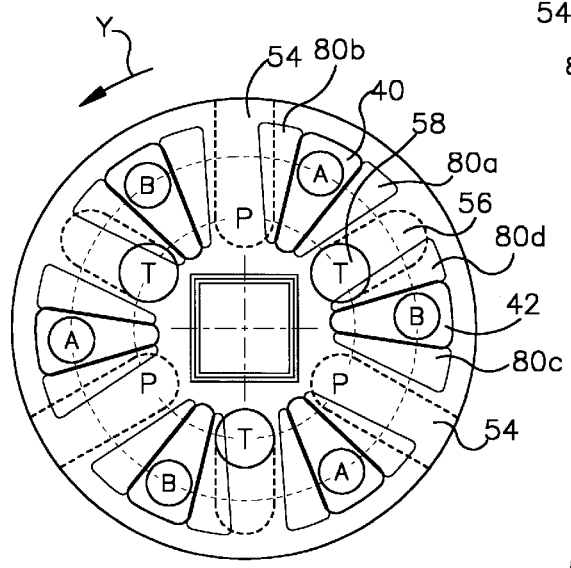
FIG. 8 is a schematic view similar to FIG. 7 showing the position of the components of the steering valve when one of the components of the valve is rotated in the direction of arrow Y under parking conditions.
Figure 11:
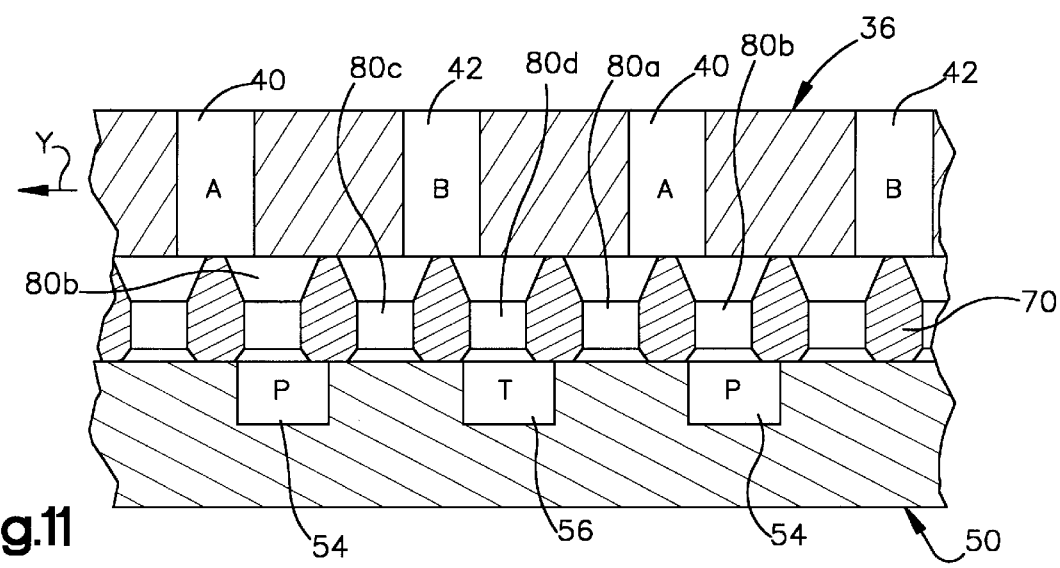
FIG. 11 is a schematic view similar to FIG. 10 illustrating the position of the components of the valve when one of the components is rotated in the direction of arrow Y under parking conditions (corresponds to the position of the valve components in FIG. 8)

According to a preferred embodiment of the invention, the intermediate disk 70 is connected by the connecting pin 122 to the first face valve member 36 for rotation with the first face valve member relative to the second face valve member 50 at vehicle speeds indicative of parking conditions to provide a relatively high level of steering assistance to the driver of the vehicle. With the intermediate disk 70 connected to the first face valve member 36, rotation of the steering shaft causes corresponding rotation of the input shaft 32 and associated first valve member 36, as well as the intermediate disk 70. FIGS. 8 and 11 illustrate the respective positions of the first face valve member 36, the intermediate disk 70, and the second face valve member 50 during parking conditions when the input shaft 32 has been rotated in the direction of arrow Y.

As the first face valve member 50 and intermediate disk 70 are rotated from their respective positions in the neutral steering condition to the positions shown in FIGS. 8 and 11, the relationship of the channels 40, 42 in the first face valve member 36 to the openings 80a–80d in the intermediate disk 70 remains the same. Meanwhile, the relationship of the passages 54, 56 in the second face valve member 50 to the openings 80a–80d in the intermediate disk 70 changes.

By virtue of the relatively small length L2 of the second chamfer 102 defining the flared second end portion 92 of each opening 80a–80d and the relatively sharp angle B at which each second chamfer extends, the flow area from the passages 54 into the openings 80b is quickly increased to provide additional hydraulic fluid flow to the channels 40. Simultaneously, the flow area from the openings 80d into the passages 56 is quickly increased to provide additional hydraulic fluid flow back to the passages 56. The relative quickness with which these flow changes occur provides the driver with the relatively high level of steering assistance in a responsive manner.

Figure 9:
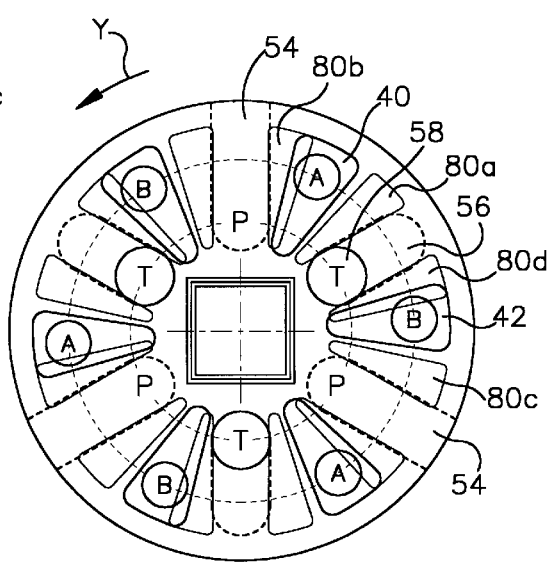
FIG. 9 is a schematic view similar to FIG. 7 showing the position of the valve components when one of the components is rotated in the direction of arrow Y under driving conditions.
Figure 12:
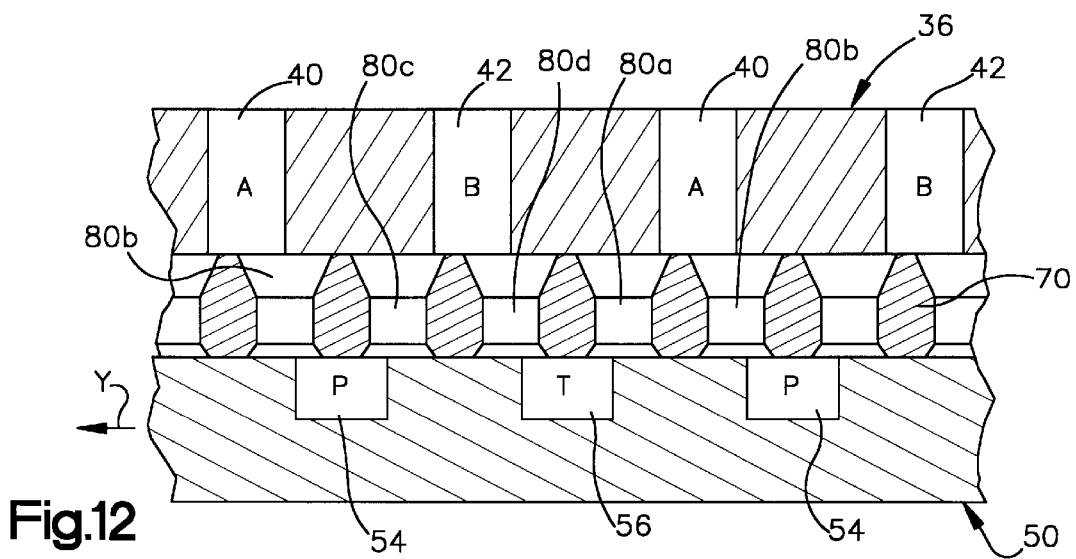
FIG. 12 is a schematic view similar to FIG. 10 illustrating the position of the components of the valve when one of the components is rotated in the direction of arrow Y under driving conditions (corresponds to the position of the valve components in FIG. 9)

In further accordance with the preferred embodiment of the invention, the intermediate disk 70 is connected by the connecting pin 122 to the second face valve member 50 for rotation with the second face valve member relative to the first face valve member 36 at vehicle speeds indicative of driving conditions to provide a relatively low level of steering assistance to the driver of the vehicle. With the intermediate disk 70 connected to the second face valve member 50, rotation of the steering shaft causes corresponding rotation of the input shaft 32 only. FIGS. 9 and 12 illustrate the respective positions of the first face valve member 38, the intermediate disk 70, and the second face valve member 50 during driving conditions when the input shaft 32 has been rotated in the direction of arrow Y.

As the second face valve member and intermediate disk 70 are rotated from their respective positions relative to the first face valve member 36 in the neutral steering condition to the positions shown in FIGS. 9 and 12, the relationship of the channels 40, 42 in the first face valve member 36 to the openings 80a–80d in the intermediate disk 70 changes, while the relationship of the passages 54, 56 in the second face valve member 50 to the openings 80a–80d in the intermediate disk remains the same.

By virtue of the relatively large length L1 of the first chamfer 100 defining the flared first end portion 90 of each opening 80a–80d and the relatively small angle α at which the first chamfer extends, the flow area from the channels 40 into the openings 80b increases slowly to provide very little additional hydraulic fluid flow into the channels 42. Simultaneously, the flow area from the channels 42 decreases slowly to only slightly reduce the hydraulic fluid flow to the channels 42. The relative slowness with which these flow changes occur provides the driver with the relatively low level of steering assistance during driving conditions.

Figure 14:
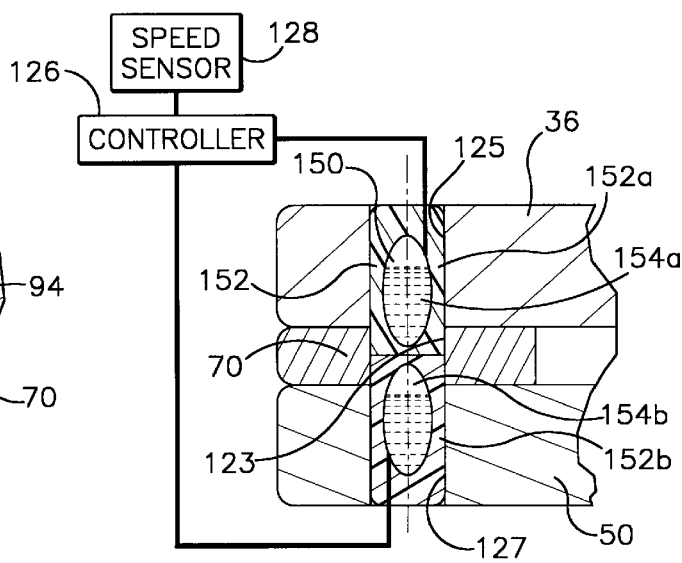
FIG. 14 is a schematic view similar to FIG. 3 illustrating an alternate embodiment of the present invention.

FIG. 14 illustrates an alternate embodiment of the present invention in which the connecting pin 122 and actuator 124a, 124b of the previous embodiment are replaced by a controllable element 150 containing an electrorheological fluid operatively coupled to the controller 126. The element 150 comprises an elastic body 152 separated into two portions 152a and 152b, each portion having a chamber 154a and 154b, respectively, containing the electrorheological fluid. The electrorheological fluid is of a known composition which changes viscosity in response to electricity. Electricity is sent from the controller 126 to one or the other of the chambers 154a, 154b to solidify the electrorheological fluid contained therein to connect the intermediate disk 70 with the either first face valve member 36 or the second face valve member 50, depending on the sensed vehicle speed.

Figure 15:
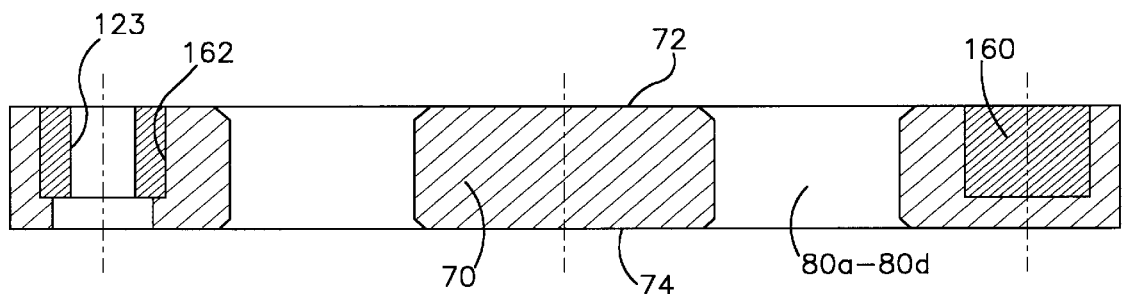
FIG. 15 is a schematic sectional view of the component of the steering valve shown in FIG. 5 illustrating another alternate embodiment of the present invention.

FIG. 15 illustrates another alternate embodiment of the present invention in which a ring-shaped setting ring gauge 160 is located in an annular groove 162 in the intermediate disk. The setting ring gauge 160 includes the bore 123 for receiving either the connecting pin 122 or the electrorheological element 150. The setting ring gauge 160 allows for angular adjustment of the intermediate disk 70 relative to the first and second face valve members 36 and 50 during the assembly of the steering valve 30.

Figure 16:
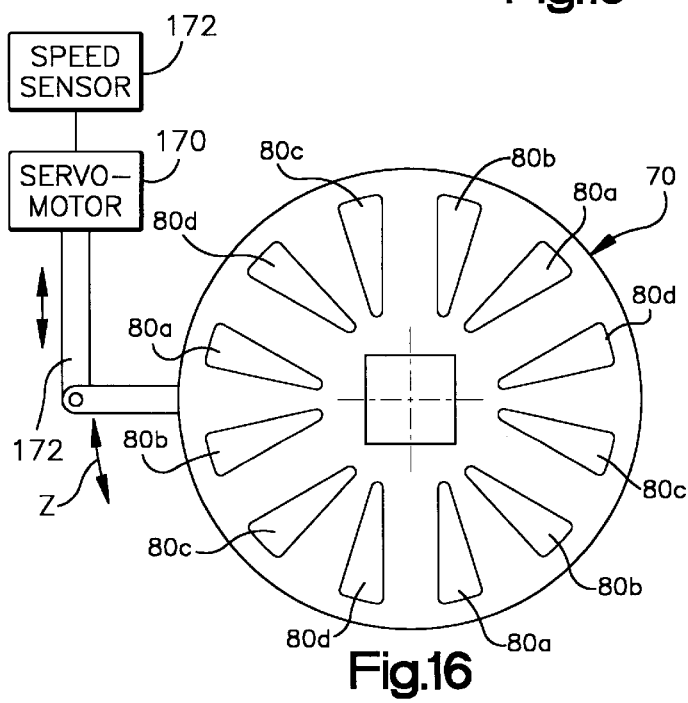
FIG. 16 is a schematic view similar to FIG. 5 showing yet another alternative embodiment of the present invention.

FIG. 16 illustrates yet another alternate embodiment of the present invention in which the intermediate disk 70 is independently rotated by a servomotor 170 and associated actuator 172. The servomotor 170 and actuator 172 provide the ability to rotate in the directions indicated by arrow Z the intermediate disk 70 along with either the first face valve member 36 or the second face valve member 50 without having to physically connect the intermediate disk to either of the face valve members.

Figure 17:
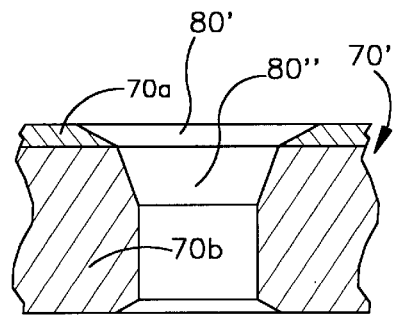
FIG. 17 is an enlarged view similar to FIG. 13 showing still another alternate embodiment of the present invention.

FIG. 17 illustrates still another alternate embodiment of the present invention in which an intermediate disk 70' comprises two intermediate disk members 70a and 70b. Each of the two intermediate disk members 70a, 70b is independently rotatable and each can be connected to an adjoining face valve member by one of the methods described previously. The two intermediate disk members 70a and 70b have aligned openings 80' and 80", respectively, with different chamfer angles and different lengths to provide further variation in the response characteristics of the steering valve.

From the above description of the invention, those skilled in the art will perceive improvements, changes and modifications. Such improvements, changes and modifications within the skill of the art are intended to be covered by the appended claims.

Having described the invention, I claim:

1. A steering valve for directing hydraulic fluid from a hydraulic fluid source to a hydraulic cylinder of a steering system in a vehicle, said steering valve comprising:

a rotatable first shaft having a first face valve member on a first end portion of said first shaft, said first face valve member including a radially extending first surface;

a rotatable second shaft having a second face valve member on a second end portion of said second shaft, said second face valve member including a radially extending second surface lying parallel to said first surface of said first face valve member;

one of said first and second face valve members including a plurality of channels fluidly connected with the hydraulic cylinder and the other of said first and second face valve members including a plurality of passages fluidly connected with the hydraulic fluid source;

a rotatable intermediate disk located between said first and second face valve members, said intermediate disk including a plurality of axially extending bores for fluidly connecting said plurality of channels in said one of said first and second face valve members with said plurality of passages in said other of said first and second face valve members; and a mechanism selectively connecting said intermediate disk with said one of said first and second face valve members for rotation with said one of said face valve members relative to said other of said first and second face valve members in response to a sensed vehicle parameter to provide a first level of steering assistance to a driver of the vehicle, said mechanism selectively connecting said intermediate disk with said other of said first and second face valve members for rotation with said other of said face valve members relative to said one of said first and second face valve members in response to said sensed vehicle parameter to provide a second level of steering assistance to the driver of the vehicle.

2. The steering valve of claim 1 wherein said mechanism selectively connecting said intermediate disk with one of said first and second face valve members includes an actuatable connecting pin movable by a controllable mechanical actuator.

3. The steering valve of claim 1 wherein said mechanism selectively connecting said intermediate disk with one of said first and second face valve members includes a controllable element containing electrorheological fluid operatively coupled to a controller.

4. The steering valve of claim 1 wherein said sensed vehicle parameter is vehicle speed.

5. The steering valve of claim 1 wherein said intermediate disk includes an annular groove containing a setting ring gauge for adjusting the angular position of said intermediate disk relative to said first and second face valve members.

6. The steering valve of claim 1 further comprising means for drivingly rotating said intermediate disk relative to at least one of said first and second face valve members.

7. The steering valve of claim 1 wherein said intermediate disk comprises at least two intermediate disk members.

8. The steering valve of claim 1 wherein said first shaft comprises an input shaft and said second shaft comprises an output shaft.

9. The steering valve of claim 8 further comprising a torsion bar centered on said axis and having oppositely disposed first and second ends, said first end of said torsion bar being connected to said input shaft and said second end of said torsion bar being connected to said output shaft.

10. The steering valve of claim 1 wherein said intermediate disk is connected with said first face valve member under parking conditions to provide a relatively high level of steering assistance to the driver of the vehicle, said intermediate disk being connected with said second face valve member under driving conditions to provide a relatively low level of steering assistance to the driver of the vehicle.

11. The steering valve of claim 1 wherein each of said plurality of bores in said intermediate disk has a flared first end portion and a flared second end portion, said flared first and second end portions being connected by a middle portion comprising a cylindrical surface.

12. The steering valve of claim 11 wherein said flared first end portion adjoins said radially extending first surface of said first face valve member and is defined by a first chamfer extending at a first angle from said cylindrical surface, said flared second end portion adjoining said radially extending second surface of said second face valve member and being defined by a second chamfer extending at a second angle from said cylindrical surface, said first angle being smaller than said second angle.

13. The steering valve of claim 12 wherein said first chamfer has a first length and said second chamfer has a second length, said first length of said first chamfer being larger than said second length of said second chamfer.

14. A steering valve for directing hydraulic fluid from a hydraulic fluid source to a hydraulic cylinder of a steering system in a vehicle, said steering valve comprising:

first and second valve members centered on an axis and being independently relatively rotatable about said axis, said first valve member having a plurality of channels and said second valve member having a plurality of passages;

a torsion bar centered on said axis and having oppositely disposed first and second ends, said first end of said torsion bar being connected to said first valve member and said second end of said torsion bar being connected to said second valve member;

an intermediate valve member rotatable about said axis and disposed between said first and second valve members, said intermediate valve member including a plurality of openings for fluidly connecting said plurality of channels in said first valve member with said plurality of passages in said valve member; and a mechanism selectively connecting said intermediate valve member with one of said first and second valve members for rotation with said one of said valve members relative to the other of said first and second valve members, said intermediate valve member, when rotatably connected by said mechanism with said first valve member for rotation with said first valve member relative to said second valve member, providing a first level of steering assistance to a driver of the vehicle, said intermediate valve member, when rotatably connected by said mechanism with said second valve member for rotation with said second valve member relative to said first valve member, providing a second level of steering assistance to the driver of the vehicle.

15. The steering valve of claim 14 wherein said means for selectively connecting said intermediate valve member with one of said first and second valve members includes an actuatable connecting pin movable by a controllable mechanical actuator.

16. The steering valve of claim 14 wherein said mechanism selectively connecting said intermediate valve member with one of said first and second valve members includes a controllable element containing electrorheological fluid operatively coupled to a controller.

17. The steering valve of claim 14 wherein said mechanism selectively connecting said intermediate valve member with one of said first and second valve members selectively connects said intermediate valve member with one of said first and second valve members in response to a sensed vehicle parameter.

18. The steering valve of claim 14 wherein said intermediate valve member includes an annular groove containing a setting ring gauge for adjusting the angular position of said intermediate valve member relative to said first and second valve members.

19. The steering valve of claim 14 further comprising means for drivingly rotating said intermediate valve member relative to at least one of said first and second valve members.

20. The steering valve of claim 14 wherein said intermediate valve member comprises at least two intermediate disks.

21. The steering valve of claim 14 wherein said first valve member is arranged on an input shaft and said second valve member is arranged on an output shaft.

22. The steering valve of claim 14 wherein said intermediate valve member is connected with said first valve member under parking conditions to provide a relatively high level of steering assistance to the driver of the vehicle, said intermediate valve member being connected with said second valve member under driving conditions to provide a relatively low level of steering assistance to the driver of the vehicle.

23. The steering valve of claim 14 wherein each of said plurality of openings in said intermediate valve member has a flared first end portion and a flared second end portion, said flared first and second end portions being connected by a middle portion comprising a cylindrical surface.

24. The steering valve of claim 23 wherein said flared first end portion adjoins said first valve member and is defined by a first chamfer extending at a first angle from said cylindrical surface, said flared second end portion adjoining said second valve member and being defined by a second chamfer extending at a second angle from said cylindrical surface, said first angle being smaller than said second angle.

25. The steering valve of claim 24 wherein said first chamfer has a first length and said second chamfer has a second length, said first length of said first chamfer being larger than said second length of said second chamfer.

* * * * *